Nov. 12, 1946.  N. O. MYKLESTAD  2,410,992
FLOATING SHOCK ABSORBER
Filed Nov. 27, 1944
Fig. 1.
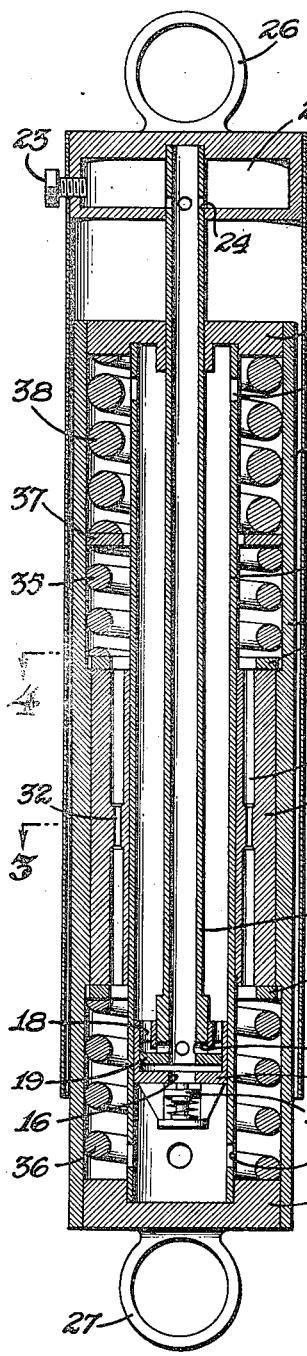
Fig. 2.
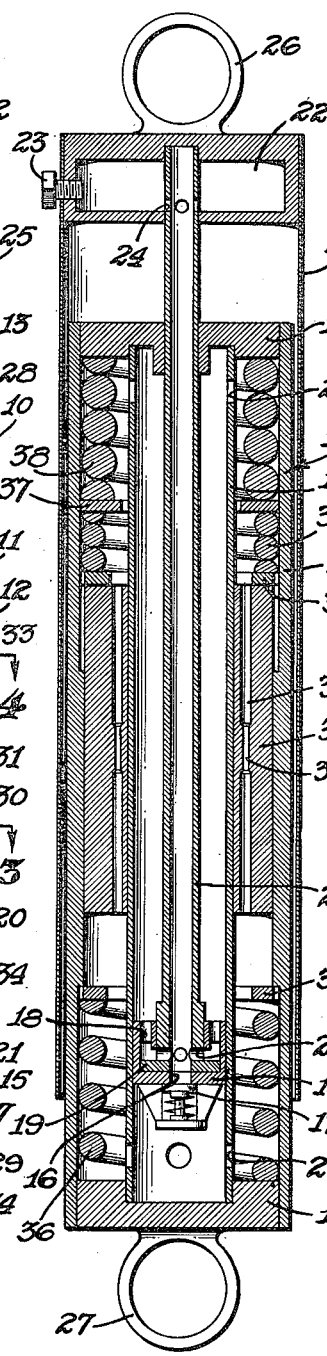
Fig. 3.
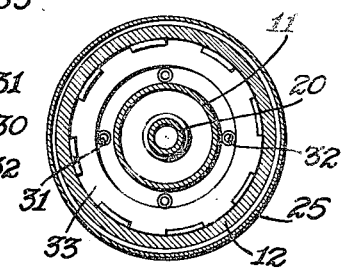
Fig. 4.
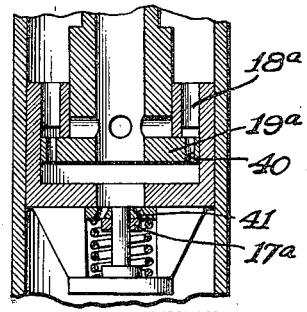
Fig. 5.
INVENTOR.
N. O. MYKLESTAD
BY
Hazard and Miller
ATTORNEY Patented Nov. 12, 1946

2,410,992

UNITED STATES PATENT OFFICE 2,410,992

FLOATING SHOCK ABSORBER

Nils O. Myklestad, Pasadena, Calif.

Application November 27, 1944, Serial No. 565,313

6 Claims. (Cl. 188—88)

This invention relates to improvements in shock absorbers.

In the conventional shock absorber there is a piston and a cylinder that are connected to two relatively movable parts such as for example, the running gear and the frame of a vehicle. When relative movement between these parts occurs the piston forces a fluid such as a light oil through a stationary stricture or orifice and the resistance of the fluid to being forced through the stricture offers the retarding effort that resists or retards relative movement between the parts. An objection to such a construction resides in the fact that the stricture or orifice when it is stationarily positioned can and will offer the maximum resistance to the passage of oil therethrough depending upon the velocity with which the movable parts move relatively to each other. Thus, if the piston is urged to move relatively to the cylinder suddenly or with high velocity a maximum retarding effect is immediately effective to resist relative movement. It is only when the piston and cylinder move relatively to each other at a slow velocity that the retarding effort created by the stricture is reduced.

An object of the present invention is to provide an improved shock absorber wherein the stricture or orifice is movably mounted and has its movement in turn retarded by springs. With this arrangement the effect of the stricture in retarding relative movement between the piston and cylinder is somewhat delayed in that if the piston moves relatively to the cylinder suddenly or with high velocity the stricture-providing means is bodily shifted under the effect of the fluid and is directly opposed in its movement by the springs. In this way during a stroke of the piston relatively to the cylinder the movement if sudden, is at first spring-opposed and the retarding effect of the stricture increases in direct proportion to the compression of the spring. Consequently with this delayed action or built-up action severe shocks are not transmitted to the frame of the vehicle and the life of the vehicle is materially prolonged with smoother riding obtained.

Another object of the invention is to provide a shock absorber having the above-mentioned characteristics wherein a limited amount of lost motion or loose play is present between the piston rod and its piston such loose play permitting small movements of the piston rod relatively to the cylinder without causing any shock absorbing action to take place whatsoever. Thus, where there may be a multiplicity of small vibrations of low amplitude but of high velocity these vibrations because of their low amplitude are not retarded at all and forces involved in retarding them are not transmitted to the vehicle frame.

Still another object of the invention is to provide a shock absorber which is of relatively simple, durable, and economical construction which can be heated by the water cooling system of the vehicle when subjected to low temperatures to maintain the oil in the shock absorber of proper viscosity.

With the foregoing and other objects in view, which will be made manifest in the following detailed description and specifically pointed out in the appended claims, reference is had to the accompanying drawing for an illustrative embodiment of the invention, wherein:

Figure 1 is a diametrically vertical section through the shock absorber embodying the present invention illustrating the shock absorber in what may be regarded as a normal or neutral position;

Fig. 2 is a view similar to Fig. 1, but illustrating the position assumed by the parts at or near the end of a long downward stroke of the piston;

Fig. 3 is a horizontal section taken substantially upon the line 3—3 upon Fig. 1;

Fig. 4 is a horizontal section taken substantially upon the line 4—4 upon Fig. 1; and Fig. 5 is a partial view in vertical section illustrating details of a modified or alternative form of construction.

Referring to the accompanying drawing wherein similar reference characters designate similar parts throughout, the improved shock absorber comprising a body generally indicated at 10 providing inner and outer concentrically arranged cylinders 11 and 12 closed at their ends by end closures or caps 13 and 14.

Within the inner cylinder 11 there is disposed a piston 15 through which extends a port 16 that is adapted to be closed by an upwardly closing check valve 17. The piston is also provided with ports 18 which open upwardly to the interior of the inner cylinder 11. The piston is adapted to be actuated within its cylinder by a tubular piston rod 20 having a head 19 in which there are ports 21. The head 19 fits with a considerable vertical clearance within the piston 15 so that there is a substantial amount of vertical lost motion or relative movement permissible between the piston rod and the piston which is effective to open and close the ports 21. Thus, as illustrated in Fig. 2, wherein the piston rod 20 is in its lowermost position relative to the piston, ports 21 are fully open. In Fig. 1 these ports are illustrated as partially closed and when the tubular piston rod 20 is in its uppermost position relatively to the piston, ports 21 are fully closed by the surrounding structure of the piston.

The upper end of the piston rod extends into an air chamber or reservoir 22 which may be equipped with a filler plug 23 for replenishing the oil or other fluid in the shock absorber. The interior of this air chamber or reservoir is in communication with the hollow piston rod by means of ports 24 and the oil level therein is normally maintained at or approximately even with these ports so that there is a substantial volume of air in the air chamber above the oil therein. 25 indicates an apron that may be secured to the air chamber and which telescopically extends downwardly over the body 10. Knuckles 26 and 27 may be provided on the air chamber 22 and on the lower end closure, respectively, to provide means for attachment of the shock absorber to two relative moving parts, such as for example the running gear and the frame, respectively of a vehicle. In the top and bottom of the inner cylinder 11 there are ports 28 and 29, respectively, which establish communication between the inner cylinder 11 and the outer cylinder 12. In the outer cylinder there is a reciprocable sleeve or bushing 30 in which strictures 31 are formed. These strictures may be in the nature of a plurality of longitudinally extending small holes or they may be so formed as to provide narrow orifices indicated at 32. Spacer rings 33 and 34 are positioned against the top and bottom of the sleeve 30, respectively, and provide spring seats for helical compression springs 35 and 36. These spacer rings are preferably externally recessed or notched so that oil can not become entrapped between the sleeve or bushing and outer cylinder 12 when the spacer rings are displaced upwardly or downwardly as the case may be from a position shown in Fig. 1 to a position such as is illustrated in Fig. 2. The lower compression spring 36 has its lower end seated against the bottom closure 14 while the upper end of the compression spring 35 is seated against a spacer ring 37. A heavy compression spring 38 is seated on spacer ring 37 and has its upper end seated against the top closure 13. The spacer rings 33 and 34 are limited in their movements toward each other by internal shoulders formed on the interior of the outer cylinder 12, the lower spacer ring being illustrated as seated against its shoulder in Fig. 2. The compression springs are preferably given some initial compression, or in other words, they are pre-stressed when the structure is assembled together so that a finite force is required to force sleeve 30 from its neutral position and further compress one of these springs.

The operation of the shock absorber is substantially as follows: If the vibration or movements of the piston rod 20 relative to cylinder 11 do not exceed the length of the stroke permissible between the head 19 and the piston, the piston rod and cylinder may readily vibrate relatively to each other without shifting the piston 15 and without bringing into play or operation the effects of the strictures 32 or of the springs 35 and 36. During such conditions of operation no power is absorbed or consumed. Where the vibration between the piston rod 20 and the cylinder 11 exceeds in amplitude the length of the stroke permissible between head 19 and piston 15, this vibration if at very slow velocity may expel oil from cylinder 11 into the outer cylinder 12 and the oil may be caused to flow through the strictures 32 in sleeve 30 as long as the total pressure difference on the two ends of sleeve 30 is less than the initial spring force holding the sleeve in its central or neutral position. If the movement of the piston rod 20 relatively to the cylinder 11 is at low frequency but high amplitude, such as is the case when the body of the vehicle vibrates at one of its natural frequencies on its springs, the oil will be expelled from cylinder 11 at such a high velocity that it can not be crowded through the strictures 32 fast enough. Under these circumstances, a pressure differential is placed on opposite ends of sleeve 30 and the sleeve is forced against one of the compressed springs. Thus, as illustrated in Fig. 2, the sleeve 30 has been forced upwardly due to a powerful downward stroke of piston rod 20. When such action takes place the damping or retarding force is a combination of the resistance afforded by the strictures 32 and the spring or springs tending to return the sleeve to its central or neutral position illustrated in Fig. 1. Later in the stroke, particularly as vibratory velocity diminishes, any spring that has been compressed will again extend and may return the sleeve 30 to its neutral position before the piston reaches the end of its stroke. If the springs are made relatively stiff and the strictures 32 quite narrow a large amount of energy can be absorbed per stroke in this manner. It will, of course be appreciated that upon a change of direction of stroke of the piston rod 20 relative to cylinder 11 that the initial movement or beginning of the changed stroke is not retarded whatsoever because of the lost motion between head 19 and piston 15. As soon as this lost motion is taken up the retarding effort or damping effect quickly builds up an equilibrium condition whereas the force of the oil that is being crowded through the strictures 32 is opposed by the expansive efforts of the compressed spring or springs. This building up of the retarding effort, as distinguished from its becoming immediately effective which would be the case if the strictures were stationary, reduces the transmission of shocks to the frame of the vehicle, thus promoting longer life for the vehicle and contributing to easier riding. Also, when the amplitude of the vibratory motion is large the length of stroke necessary to take up the lost motion becomes only a small fraction of the total stroke. If the movement of the piston rod relatively to the cylinder is at high velocity the oil will be expelled from cylinder 11 at such a rate that only a small part of it can be crowded through the strictures 32 as long as the amplitude of motion is small enough so as to not compress the springs with great force. Due to the rapid compression of the stroke in cases of high frequency most of the extension of the spring will take place at the beginning of the return stroke thereby delaying the lost motion between piston 15 and piston rod 20. In this way, only a small amount of energy will be absorbed by the shock absorber under these conditions which is highly desirable. On a very bumpy road, however, the movement of the piston rod relatively to the cylinder may be both very rapid and also of large amplitude such as is occasioned by a series of severe shocks. Again it becomes necessary for the shock absorber to absorb a large amount of energy in order to prevent large vibratory motions of the vehicle. Under these circumstances, the very heavy spring 38 is utilized and as this spring is capable of asserting a very great force the oil is forced through the strictures 32 with very high velocity before the long rapid stroke can be completed. In this way, a large amount of energy can be absorbed before any sudden shock whatsoever is transmitted to the vehicle. It will, of course, be appreciated that if no oil whatsoever flows through the strictures the springs would be fully compressed for a motion of the piston rod relatively to the cylinder of only about one-half of the maximum permissible motion. This insures that for large amplitudes of vibratory motion a large amount of oil must always flow through the strictures thereby exerting a powerful damping influence when it is most needed. For small amplitudes of motion on the other hand, damping is undesirable and under these conditions the spring force will not increase to such a magnitude that a large amount of oil is forced through the strictures.

In Fig. 5, I have illustrated a modified form of construction wherein the head 19a has formed therethrough small passages 40 arranged in alignment with the ports 18a. The check valve 17a has one or more small passages 41 formed therein. In this form of construction the sleeve utilized does not have any passages or strictures therethrough but provides a movable but impervious barrier between the top and bottom of the outer cylinder 12. In this form of construction during downward strokes check valve 17a will, of course, close and the sleeve may or may not be forced upwardly against the upper springs. The oil is crowded or forced through the apertures 41 into the tubular piston rod. Conversely, on upward strokes oil in the inner cylinder 11 may be forced downwardly through passages 40 and its pressure may or may not be effective to force sleeve 30 downwardly within the outer cylinder 12. In this form of construction there are the same advantages previously described and explained except that the oil, instead of being forced through strictures in the sleeve is forced through corresponding passages in the head 19a and the check valve 17a, respectively.

Various changes may be made in the details of construction without departing from the spirit and scope of the invention as defined by the appended claims.

I claim:

1. A shock absorber comprising means providing two concentric cylinders communicating with each other at their ends, a piston reciprocable within the inner cylinder, a sleeve movably fitting in the outer cylinder, strictures formed in the sleeve restricting flow therethrough, and means for retarding movements of the sleeve.

2. A shock absorber comprising concentric cylinders in communication with each other at their ends, a piston reciprocable within the inner cylinder, a sleeve having strictures therethrough, reciprocable in the outer cylinder, and spring means in the outer cylinder urging the sleeve into a neutral or normal position.

3. A shock absorber comprising means providing a pair of concentric cylinders, a piston reciprocable in the inner cylinder, a piston rod extending into the inner cylinder and operatively connected to said piston to reciprocate it, a stricture-providing means reciprocable in the outer cylinder, and spring means urging said stricture-providing means into a neutral or central position.

4. A shock absorber comprising means providing a pair of concentric cylinders, a piston reciprocable in the inner cylinder, a piston rod extending into the inner cylinder and operatively connected to said piston to reciprocate it, a stricture-providing means reciprocable in the outer cylinder, and spring means urging said stricture-providing means into a neutral or central position, there being a loose play between the piston rod and the piston and for the purpose described.

5. A shock absorber comprising means providing a pair of concentric cylinders, a piston reciprocable in the inner cylinder, a piston rod extending into the inner cylinder and operatively connected to said piston to reciprocate it, a stricture-providing means reciprocable in the outer cylinder, spring means urging said stricture-providing means into a neutral or central position, said piston having passages therethrough, a check valve preventing flow through the piston in one direction, and means on the piston rod for opening and closing passages through the piston rod against flow therethrough in the other direction.

6. A shock absorber comprising means providing a pair of concentric cylinders, a piston reciprocable in the inner cylinder, a piston rod extending into the inner cylinder and operatively connected to said piston to reciprocate it, a stricture-providing means reciprocable in the outer cylinder, spring means urging said stricture-providing means into a neutral or central position, said piston having passages therethrough, a check valve preventing flow through the piston in one direction, and means on the piston rod for opening and closing passages through the piston rod against flow therethrough in the other direction said piston rod being hollow and an air chamber in communication therewith.

N. O. MYKLESTAD.